United States Patent
Yehle et al.

(10) Patent No.: US 6,840,740 B2
(45) Date of Patent: Jan. 11, 2005

(54) BUCKET DOVETAIL DESIGN FOR TURBINE ROTORS

(75) Inventors: Gary Edward Yehle, Clifton Park, NY (US); Wayne Alan Lillibridge, Clifton Park, NY (US); Noel Jacob Bylina, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/310,855

(22) Filed: Dec. 6, 2002

(65) Prior Publication Data

US 2004/0109766 A1 Jun. 10, 2004

(51) Int. Cl.⁷ .............................................. F01D 5/30
(52) U.S. Cl. ........................ 416/220 R; 416/84; 416/500
(58) Field of Search .................. 416/220 R, 219 R, 416/500, 222, 248, 84, 106–107

(56) References Cited

U.S. PATENT DOCUMENTS

| | | | |
|---|---|---|---|
| 2,036,083 A | * | 3/1936 | Robinson ................ 416/213 R |
| 2,315,616 A | * | 4/1943 | Hall ......................... 416/217 |
| 2,844,355 A | * | 7/1958 | Rankin ...................... 416/216 |
| 4,480,957 A | | 11/1984 | Patel et al. |
| 4,572,980 A | | 2/1986 | Anderson et al. |
| 4,702,673 A | * | 10/1987 | Hansen et al. ............... 416/215 |
| 4,837,471 A | | 6/1989 | Kostoss et al. |
| 5,257,909 A | | 11/1993 | Glynn et al. |
| 5,310,317 A | | 5/1994 | Bailey et al. |
| 5,310,318 A | | 5/1994 | Lammas et al. |
| 5,318,405 A | | 6/1994 | Meade et al. |
| 5,340,280 A | | 8/1994 | Schilling |
| 5,474,423 A | | 12/1995 | Seeley et al. |
| 5,494,408 A | | 2/1996 | Seeley et al. |
| 5,531,569 A | | 7/1996 | Seeley |
| 6,030,178 A | | 2/2000 | Caruso |
| 6,033,185 A | | 3/2000 | Lammas et al. |
| 6,142,737 A | | 11/2000 | Seeley et al. |
| 6,168,382 B1 | | 1/2001 | Nolan et al. |
| 6,364,613 B1 | | 4/2002 | Deallenbach et al. |
| 6,428,279 B1 | * | 8/2002 | Reluzco et al. ............. 416/215 |
| 6,435,833 B1 | | 8/2002 | Reluzco et al. |
| 6,435,834 B1 | | 8/2002 | Reluzco et al. |

* cited by examiner

Primary Examiner—Edward K. Look
Assistant Examiner—James M. McAleenan
(74) Attorney, Agent, or Firm—Nixon & Vanderhye P.C.

(57) ABSTRACT

A turbine bucket dovetail secures buckets in a turbine rotor. The turbine bucket dovetail includes a plurality of hooks engageable with a wheel post of the turbine rotor, which hooks extend in an axial direction relative to the turbine rotor. A pocket is machined in a tangential face of the dovetail, resulting in reduced peak stress in the wheel post dovetail edge at the gate opening.

14 Claims, 4 Drawing Sheets

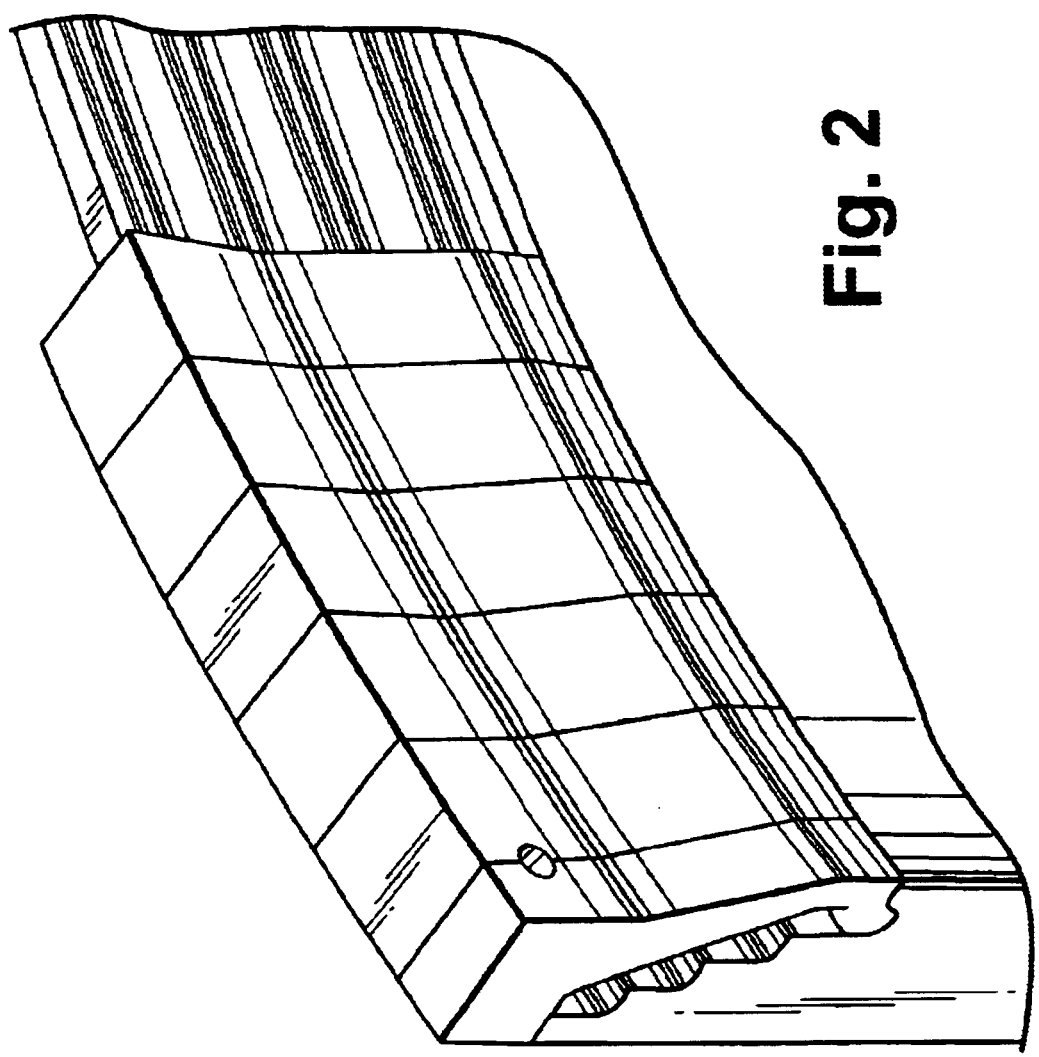
Fig. 2
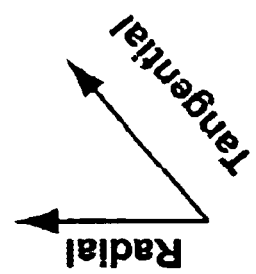

BUCKET DOVETAIL DESIGN FOR TURBINE ROTORS

BACKGROUND OF THE INVENTION

The present invention relates to a turbine bucket dovetail for assembly of buckets on steam turbine rotors and, more particularly, to a bucket dovetail where the dovetail shape introduces a design feature aimed at minimizing the concentrated stress (caused by the centrifugal force of buckets) in the wheel hook fillets while maintaining an overall size that is compatible with existing steam paths.

As a result of contaminated steam found in many existing turbines, the tangential entry dovetails on the latter stages of low pressure rotors operate in an environment that is conducive to stress corrosion cracking (SCC). SCC is accelerated by the stress levels that are present in the hook fillet region of typical dovetail configurations. Normally, these stresses are acceptable, but in contaminated steam, cracks can initiate and, left undetected, grow to a depth that will cause failure of wheel hooks. In extreme cases, all of the hooks will fail and buckets will fly loose from the rotor.

The tangential entry dovetail design necessitates an opening in the wheel periphery where the buckets are first inserted into the wheel radially and then slid tangentially into place. This wheel opening is defined as the "gate." The gate is filled after all the buckets have been assembled on the wheel with a special bucket called a closure bucket. The closure bucket is secured in position with cross-keys. Cross-keys are required because of the absence of retaining hooks employed by the buckets in the row. The cross-key is passed through the "solid" portion of the closure piece and the adjacent bucket (auxiliary) above the wheel rim. At operating speed, the closure piece imposes an additional load on the auxiliary buckets by nature of the keying arrangement. The cross-key design transmits 50% of the closure piece centrifugal force to each auxiliary bucket. The centrifugal load from the closure/auxiliary buckets along with the stress concentration factors created by the abrupt change in dovetail geometry produces the peak wheel hook fillet stress at the gate.

Experience shows that wheel hooks crack and bucket hooks do not crack. This is because the NiCrMoV and similar low alloy steels used for low pressure rotors are much less resistant to SCC than are the 12 Cr steels used for buckets. NiCrMoV steels give the optimum combination of properties available for overall low pressure rotor design considerations. Thus, an effective means of avoiding SCC in the typical low pressure steam environment is to reduce the stresses in the wheel dovetail to acceptable levels. It is recognized by the turbine industry that if the peak stress in components operating in a corrosive environment is below the yield strength of the material, the resistance to SCC is greatly improved. Therefore, wheel dovetails can be designed to at least meet this criterion and strive to provide greater safety margins by reducing stresses even further.

BRIEF DESCRIPTION OF THE INVENTION

In an exemplary embodiment of the invention, a turbine bucket dovetail is provided for securing buckets in a turbine rotor. The turbine bucket dovetail includes a plurality of hooks engageable with a wheel post of the turbine rotor, which hooks extend in an axial direction relative to the turbine rotor, and a pocket machined in a tangential face of the dovetail.

In another exemplary embodiment of the invention, a turbine rotor includes a rotatable wheel post including a wheel post dovetail with a gate opening, and a plurality of turbine buckets each secured to the wheel post dovetail via a turbine bucket dovetail. The plurality of turbine buckets include a closure bucket at the gate opening and a pair of auxiliary buckets sandwiching and securing the closure bucket via cross keys. The auxiliary buckets each comprise a plurality of hooks engageable with the wheel post, which hooks extending in an axial direction relative to the turbine rotor, and a pocket machined in a tangential face of the dovetail.

In yet another exemplary embodiment of the invention, a method of constructing a turbine bucket dovetail for securing buckets in a turbine rotor is provided. The method includes the steps of forming a plurality of hooks engageable with a wheel post of the turbine rotor, the hooks extending in an axial direction relative to the turbine rotor; and machining a pocket in a tangential face of the dovetail.

BRIEF DESCRIPTION OF THE DRAWINGS

FIG. 2 shows a half model of a closure bucket located at the gate opening;

DETAILED DESCRIPTION OF THE INVENTION

Figure 1:
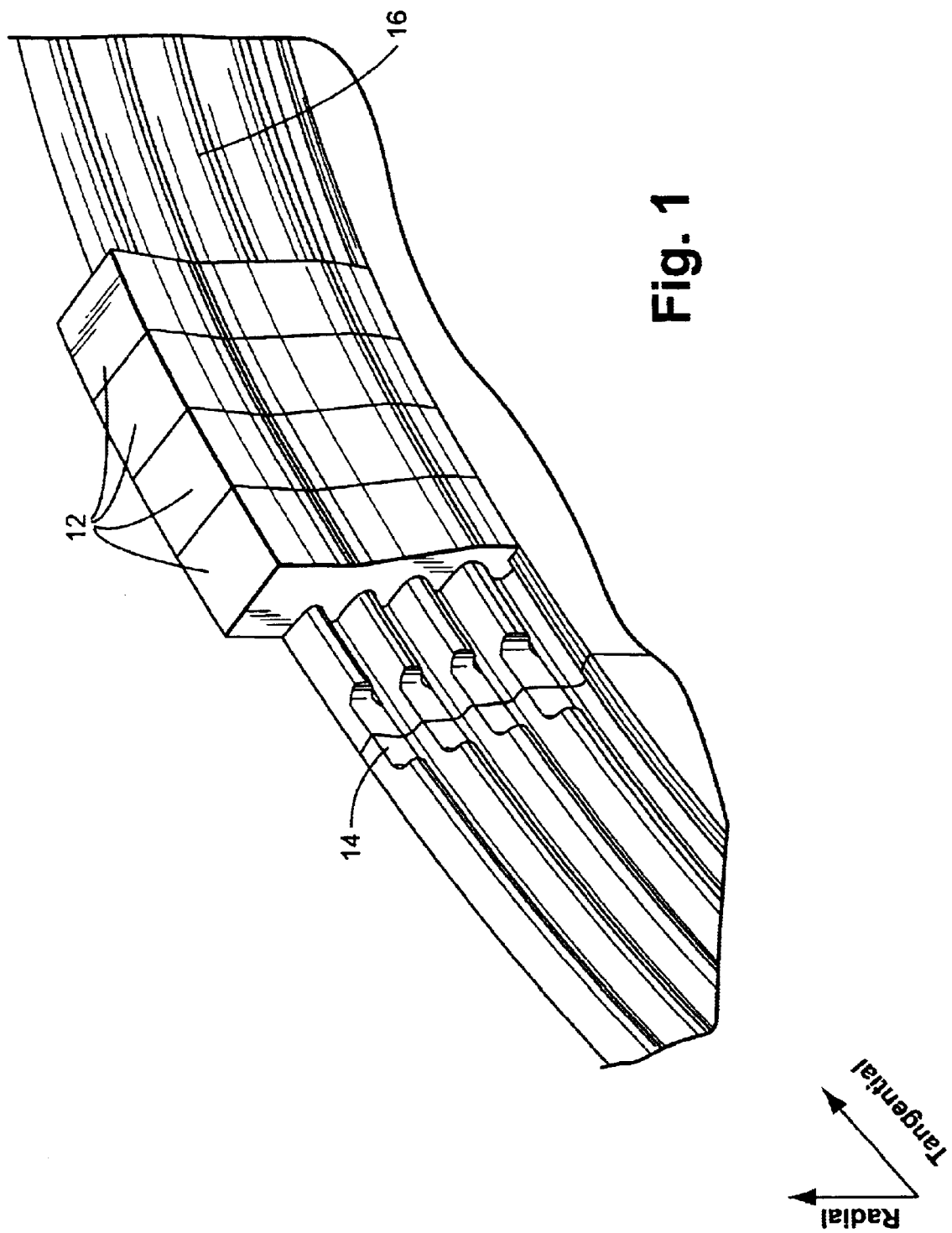
FIG. 1 illustrates a bucket and wheel arrangement showing standard bucket dovetails inserted over a gate opening and slid into position.
Figure 3:
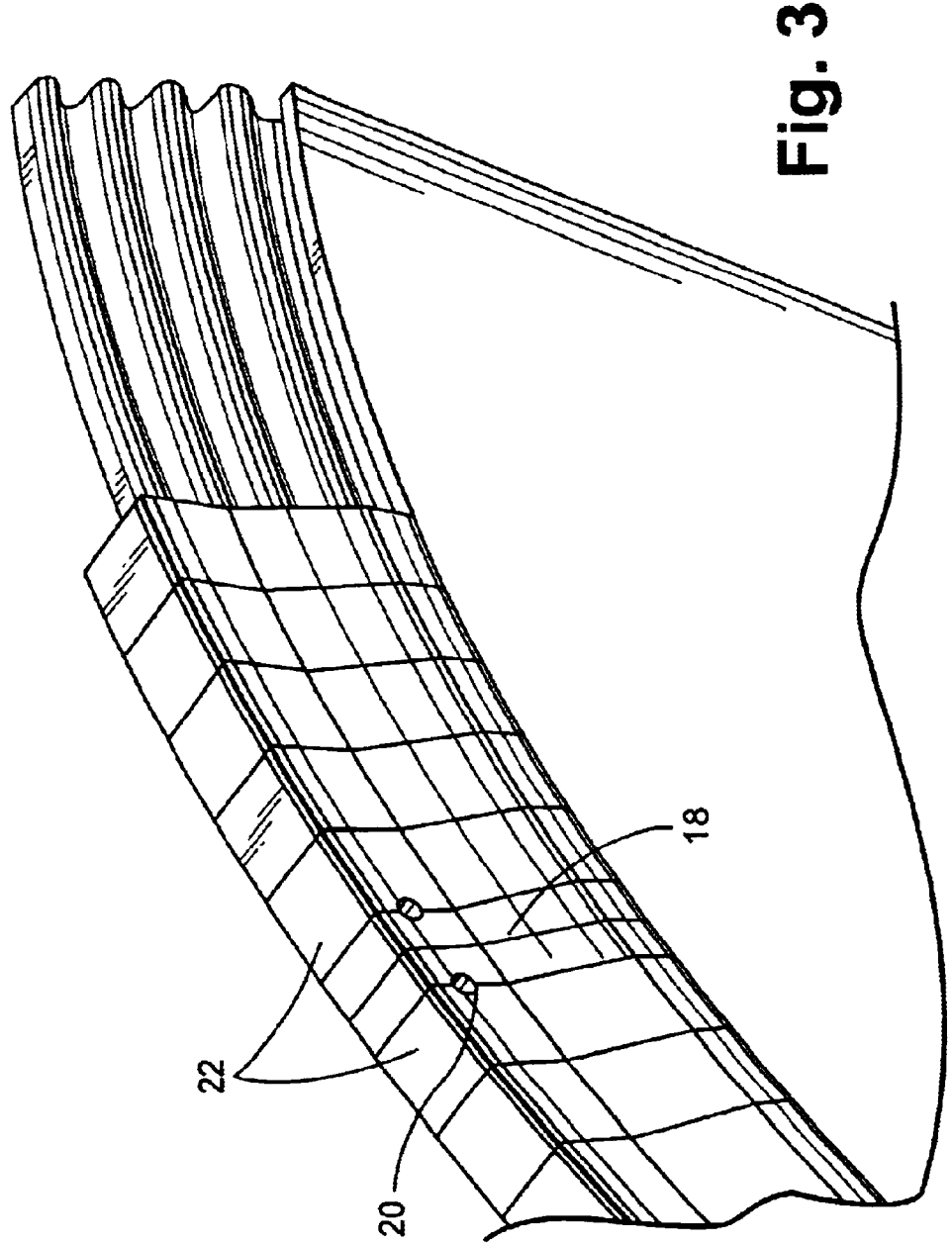
FIG. 3 shows an assembled row of buckets.

FIGS. 1–3 illustrate a bucket and wheel arrangement at assembly. Standard bucket dovetails 12 are located over a wheel post gate opening 14 in a wheel post dovetail 16 and slid into position. The gate 14 is filled after all the buckets have been assembled on the wheel with a special bucket called a closure bucket 18. The closure bucket 18 is secured in position with cross-keys 20. Cross-keys 20 are required because of the absence of retaining hooks employed by the buckets in the row. Each cross-key 20 is passed through the "solid" portion of the closure piece 18 and the adjacent bucket (auxiliary) 22 above the wheel rim. The auxiliary buckets 22 not only carry their own centrifugal load, but also 50% of the closure bucket 18 centrifugal load through the cross-keys 20. These forces give rise to stress in the wheel post dovetail 16, and the peak stresses are in the fillet region of the hooks near the gate opening 14. In order to limit the peak stresses near the gate opening 14 to a value that is well below the yield strength of the rotor material, a pocket 24 is machined in a tangential entry dovetail.

Figure 4:
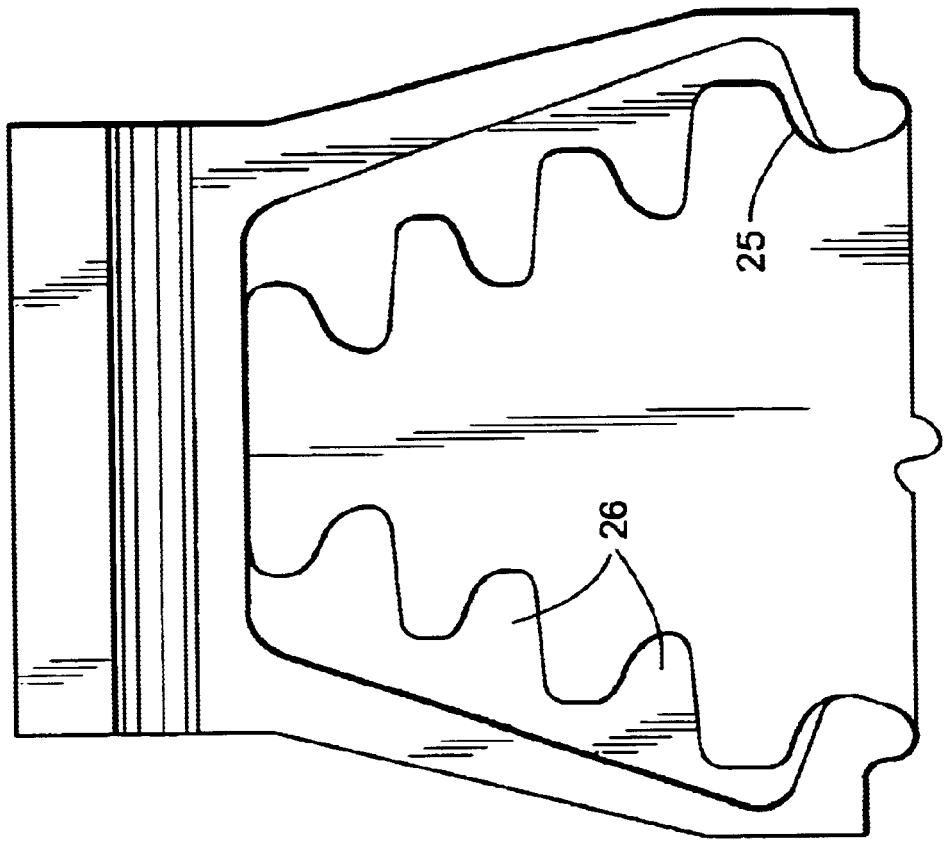
FIG. 4 is a front view of the auxiliary bucket of the present invention.
Figure 5:
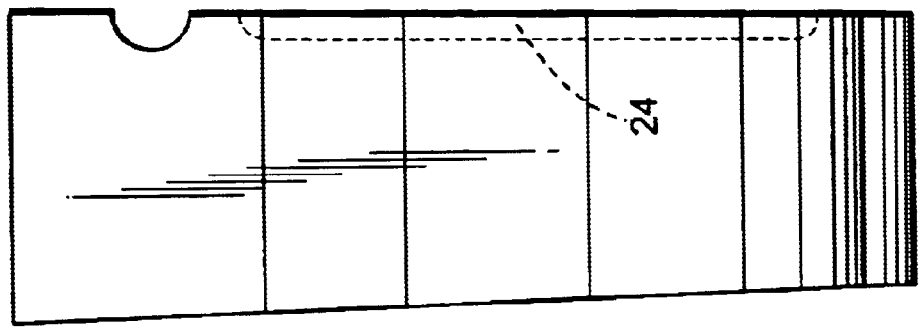
FIG. 5 is a side view of the auxiliary bucket of FIG. 4.

With reference to FIGS. 4 and 5, the pocket 24 is machined on the side of the tangential entry dovetail where the cross-key hole is located. The pocket 24 encompasses the contact surface 25 of each bucket hook 26 and creates a non-contact zone on the wheel contact surface. The bucket centrifugal force at operating speed loads the wheel contact surface 25 a distance away (pocket depth) from the gate opening 14 where the highest stress concentration factors exist, thus reducing the wheel hook fillet peak stresses. In addition, there is a reduction in dovetail weight due to the pocket 24 which causes a reduction in the dovetail centrifugal force and peak stress.

Preferably, a depth of the pocket 24 for a 3-hook dovetail is between 0.180–0.210 inches, most preferably 0.180 inches, and for a 4-hook dovetail is between 0.220–0.250 inches, most preferably 0.220 inches. Narrower pockets can result in excess peak stresses, while deeper pockets can result in crush stress failures and material fretting.

A finite element analysis showed that the peak concentrated stress in the wheel dovetail is 52100 PSI for the same loading condition used to analyze the subject dovetail on stage 12 of a replacement low pressure rotor for Arizona Public Service, Palo Verde Units 1, 2, and 3, Turbine #1LR0296, 1LR0297, and 1LR0298. This represents a 21% reduction in concentrated stress for those conditions.

By means of moving the centrifugal load away from the high stress concentration factor region of the dovetail, the peak stress level will lower. The design feature is a region of the dovetail which includes the contact surfaces machined to a specific depth to create a pocket on one side of the auxiliary bucket. This moves the bucket centrifugal load away from the dovetail edge at the gate opening on the wheel post. As a consequence, a bucket to wheel dovetail configuration has peak stresses low enough at the wheel post gate opening to avoid stress corrosion cracking of the wheel hooks.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A turbine auxiliary bucket dovetail for securing closure buckets in a turbine rotor, the turbine auxiliary bucket dovetail comprising:
    a plurality of hooks engageable with a wheel post of the turbine rotor, the hooks extending in an axial direction relative to the turbine rotor; and
    a pocket machined in a tangential face of the dovetail, wherein the pocket is defined by a pocket region encompassing at least one of the plurality of hooks.

2. A turbine bucket dovetail for securing buckets in a turbine rotor, the turbine bucket dovetail comprising:
    a plurality of hooks engageable with a wheel post of the turbine rotor, the hooks extending in an axial direction relative to the turbine rotor; and
    a pocket machined in a tangential face of the dovetail, wherein the pocket is defined by a pocket region encompassing each of the plurality of hooks.

3. A turbine bucket dovetail according to claim 1, comprising three hooks engageable with each side of the wheel post, wherein a depth of the pocket is between 0.180–0.210 inches.

4. A turbine bucket dovetail according to claim 3, wherein the depth of the pocket is about 0.180 inches.

5. A turbine bucket dovetail according to claim 1, comprising four hooks engageable with each side of the wheel post, wherein a depth of the pocket is between 0.220–0.250 inches.

6. A turbine bucket dovetail according to claim 5, wherein the depth of the pocket is about 0.220 inches.

7. A turbine rotor comprising:
    a rotatable wheel post including a wheel post dovetail with a gate opening; and
    a plurality of turbine buckets each secured to the wheel post dovetail via a turbine bucket dovetail, the plurality of turbine buckets including a closure bucket at the gate opening and a pair of auxiliary buckets sandwiching and securing the closure bucket via a cross key,
    wherein the auxiliary buckets each comprise:
        a plurality of hooks engageable with the wheel post, the hooks extending in an axial direction relative to the turbine rotor, and
        a pocket machined in a tangential face of the dovetail, wherein the pocket is defined by a pocket region encompassing at least one of the plurality of hooks.

8. A turbine rotor according to claim 7, wherein the auxiliary buckets and the closure bucket comprise a cross-key groove shaped such that a cross-key hole is formed when the auxiliary buckets are disposed adjacent the closure bucket for receiving the cross key, the cross-key groove in the auxiliary buckets being formed in said tangential face of the dovetail.

9. A turbine rotor according to claim 7, wherein the pocket of the auxiliary buckets is defined by a pocket region encompassing each of the plurality of hooks.

10. A turbine rotor according to claim 7, wherein the auxiliary buckets comprise three hooks engageable with each side of the wheel post, wherein a depth of the pocket is between 0.180–0.210 inches.

11. A turbine rotor according to claim 10, wherein the depth of the pocket is about 0.180 inches.

12. A turbine rotor according to claim 7, wherein the auxiliary buckets comprise four hooks engageable with each side of the wheel post, wherein a depth of the pocket is between 0.220–0.250 inches.

13. A turbine rotor according to claim 12, wherein the depth of the pocket is about 0.220 inches.

14. A method of constructing a turbine auxiliary bucket dovetail for securing closure buckets in a turbine rotor, the method comprising:
    forming a plurality of hooks engageable with a wheel post of the turbine rotor, the hooks extending in an axial direction relative to the turbine rotor; and
    machining a pocket in a tangential face of the dovetail, wherein the pocket is defined by a pocket region encompassing at least one of the plurality of hooks.

* * * * *